United States Patent
Muto et al.

(10) Patent No.: US 9,868,433 B2
(45) Date of Patent: Jan. 16, 2018

(54) HYBRID VEHICLE

(71) Applicant: MAZDA MOTOR CORPORATION, Hiroshima (JP)

(72) Inventors: Mitsuhiro Muto, Hiroshima (JP); Koki Ito, Hiroshima (JP); Shinji Takahara, Hiroshima (JP); Jun Inada, Higashihiroshima (JP); Tomoaki Saito, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 15 days.

(21) Appl. No.: 14/895,730

(22) PCT Filed: Jun. 3, 2014

(86) PCT No.: PCT/JP2014/064668
§ 371 (c)(1),
(2) Date: Dec. 3, 2015

(87) PCT Pub. No.: WO2014/196507
PCT Pub. Date: Dec. 11, 2014

(65) Prior Publication Data
US 2016/0121874 A1     May 5, 2016

(30) Foreign Application Priority Data
Jun. 7, 2013   (JP) .................. 2013-120795

(51) Int. Cl.
| | |
|---|---|
| *B60W 20/00* | (2016.01) |
| *B60W 10/08* | (2006.01) |
| *B60K 6/24* | (2007.10) |
| *B60K 6/48* | (2007.10) |
| *B60K 6/50* | (2007.10) |
| *B60W 10/06* | (2006.01) |
| *B60W 20/10* | (2016.01) |
| *B60K 6/26* | (2007.10) |
| *F02D 41/30* | (2006.01) |
| *F02D 41/00* | (2006.01) |

(52) U.S. Cl.
CPC ............... *B60W 20/10* (2013.01); *B60K 6/24* (2013.01); *B60K 6/26* (2013.01); *B60K 6/48* (2013.01);
(Continued)

(58) Field of Classification Search
CPC ...... B60W 20/10; B60W 10/08; B60W 10/06; B60K 6/50; B60K 6/24; B60K 6/26;
(Continued)

(56) References Cited

U.S. PATENT DOCUMENTS 4,305,254 A * 12/1981 Kawakatsu .............. B60K 6/48
                                                                                  180/65.25
6,712,165 B1   3/2004 Okazaki
(Continued)

FOREIGN PATENT DOCUMENTS

JP     S59-204402 A    11/1984
JP     2000-050584 A    2/2000
(Continued)

OTHER PUBLICATIONS

International Search Report issued in Application No. PCT/JP2014/064668, dated Aug. 26, 2014.

*Primary Examiner* — Nga X Nguyen
(74) *Attorney, Agent, or Firm* — Studebaker & Brackett PC

(57) ABSTRACT

A hybrid vehicle includes an engine: a regenerative motor for use when the hybrid vehicle runs, the motor having characteristics such that the motor efficiency is 90% or more at a rotational speed of 75% of the maximum rotational speed of the motor when the load of the motor is 10% or more of the maximum load of the motor; and a transmission which transmits the power of the engine to a wheel drive shaft. The motor is coupled to the wheel drive shaft without being coupled to the transmission.

14 Claims, 6 Drawing Sheets

(52) U.S. Cl.
CPC ............... *B60K 6/50* (2013.01); *B60W 10/06* (2013.01); *B60W 10/08* (2013.01); *F02D 41/3035* (2013.01); *B60K 2006/4808* (2013.01); *B60Y 2300/43* (2013.01); *B60Y 2300/60* (2013.01); *B60Y 2300/91* (2013.01); *F02D 2041/001* (2013.01); *Y02T 10/626* (2013.01); *Y02T 10/6221* (2013.01); *Y02T 10/6295* (2013.01); *Y10S 903/93* (2013.01)

(58) Field of Classification Search
CPC ..... B60K 6/48; F02D 41/3035; Y10S 903/93; B60Y 2300/60; B60Y 2300/43; B60Y 2300/91
USPC .............. 701/22; 180/65.25, 65.265; 74/661; 903/930
See application file for complete search history.

(56) References Cited

U.S. PATENT DOCUMENTS

2001/0039230 A1* 11/2001 Severinsky ............ B60H 1/004
477/3
2005/0236198 A1* 10/2005 Jenkins ................ B60K 7/0007
180/65.51

FOREIGN PATENT DOCUMENTS

| JP | 2000-343965 A | 12/2000 |
|---|---|---|
| JP | 2002-160540 A | 6/2002 |
| JP | 2006-159974 A | 6/2006 |
| JP | 2013-056620 A | 3/2013 |

\* cited by examiner

HYBRID VEHICLE

TECHNICAL FIELD

The present invention relates to a hybrid vehicle.

BACKGROUND ART

Conventionally, there is known a parallel-type hybrid vehicle provided with an engine and a regenerative motor, wherein the motor is driven in accordance with a requested output, with the wheels being driven mainly with use of the engine (see e.g. Patent Literature 1). The hybrid vehicle is configured such that in the operating range where the required output of the vehicle is low, and where the specific fuel consumption of the engine is very high, the engine is stopped and the wheels are driven solely by the motor; and in the other operating ranges, for instance, in the operating range where the specific fuel consumption is low, the engine is driven so that the engine and the motor are used in combination for improving the specific fuel consumption. Meanwhile, the hybrid vehicle is configured such that when the vehicle is decelerated, kinetic energy is converted into electric power (regenerative electric power) by a regenerative braking operation of the motor to accumulate (collect) the electricity. Thus, electric power for driving the motor is secured.

In the hybrid vehicle having the above configuration, the motor is coupled to a driving shaft such as a propeller shaft via a transmission. Thus, the hybrid vehicle incorporated with an IPM motor (Interior Permanent Magnet Synchronous) motor such as a three-phase induction motor has an advantageous configuration. Specifically, it is difficult for the IPM motor to generate a torque in a high rotational speed range because a counter electromotive force is generated due to the structure of the IPM motor. However, coupling the IPM motor to a transmission as described above for restricting the rotational speed range of the motor makes it possible to generate a torque in a wide speed range, in other words, makes it possible to output and regenerate power.

In the conventional hybrid vehicle in which a motor is coupled to a driving shaft via a transmission, however, during a braking operation when the vehicle runs at a high speed, regenerative electric power to be collected by the motor is restricted in a certain rotational speed range due to the existence of the transmission, regardless that the wheels are rotated at a high speed. In other words, the conventional art may fail to efficiently collect kinetic energy of the high-speed rotating wheels as regenerative electric power. Further, in the conventional hybrid vehicle, kinetic energy is input to the motor via the transmission. This may cause energy loss. Thus, it is difficult to efficiently collect kinetic energy as regenerative electric power.

CITATION LIST

Patent Literature

Patent Literature 1: Japanese Unexamined Patent Publication No. 2000-343965

SUMMARY OF INVENTION

An object of the invention is to provide a hybrid vehicle that enables to efficiently collect kinetic energy during traveling of the vehicle as regenerative electric power.

A parallel-type hybrid vehicle according to an aspect of the invention includes an engine; a regenerative motor for use when the hybrid vehicle runs, the motor having characteristics such that motor efficiency is 90% or more at a rotational speed of 75% of a maximum rotational speed of the motor when a load of the motor is 10% or more of a maximum load of the motor; and a transmission which transmits power of the engine to a wheel drive shaft. The motor is coupled to the wheel drive shaft without being coupled to the transmission.

DESCRIPTION OF EMBODIMENTS

A preferred embodiment of the invention is described referring to the accompanying drawings.

Figure 1:
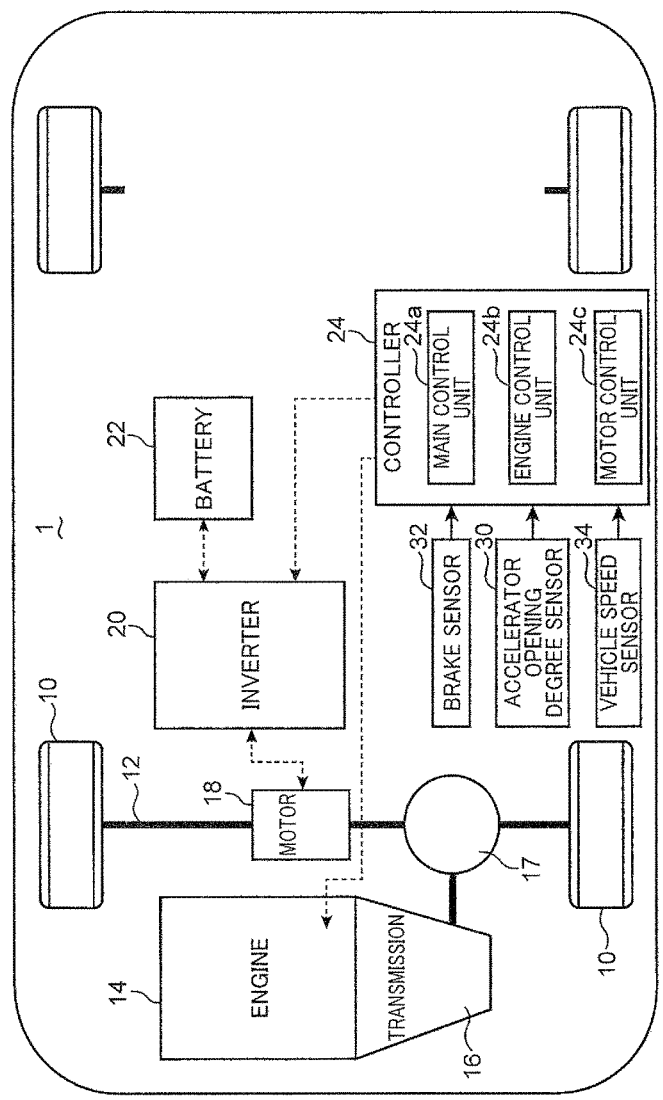
FIG. 1 is a schematic configuration diagram of a hybrid vehicle embodying the invention.

FIG. 1 is a schematic configuration diagram of a hybrid vehicle 1 embodying the invention. As illustrated in FIG. 1, the hybrid vehicle 1 is provided with wheels 10, an axle 12 (corresponding to a wheel drive shaft of the invention), an engine 14, a transmission 16, a differential gear 17, a motor 18, an inverter 20, a battery 22, and a controller 24 (corresponding to control device of the invention).

The hybrid vehicle 1 is a so-called parallel-type hybrid vehicle. The engine 14 and the motor 18 function as a driving source for outputting a driving force of the hybrid vehicle 1. The hybrid vehicle 1 is configured such that the vehicle 1 runs solely by the engine 14, or runs solely by the motor 18 depending on a driving condition. In other words, the hybrid vehicle 1 does not run by both of an engine and a motor. As will be described later, the motor 18 is driven only in an operating range where the required output of the vehicle is low, e.g. at the time when the vehicle is started, and at the time when the vehicle runs at a low speed immediately after the start of the vehicle. The motor 18 is used solely for regeneration in a condition other than the above.

The engine 14 is an in-line 4-cylinder gasoline engine, and is coupled to the axel 12 via the transmission 16.

Although illustration of a detailed diagram is omitted, the engine 14 is designed in such a manner that the geometric compression ratio ε is set to a high compression ratio of not smaller than 13 but not larger than 18. Further, the engine 14 has an operating range where lean driving is carried out at least in a partial load operating range (i.e. in a medium load operating range and in a low load operating range). In the aforementioned operating range, the fuel-air mixture is lean by setting the excess air ratio λ to a value not smaller than 2 (preferably, not smaller than 2.5) but not larger than 8, or by setting the G/F (an air-fuel ratio indicating the ratio of the amount of fuel with respect to the amount of EGR gas and fresh air) to a value not smaller than 30 but not larger than 120.

Further, the engine 14 is configured such that the effective expansion ratio is set higher than the effective compression ratio of the engine 14 by setting an intake valve open timing to be retarded from the bottom dead center position by a predetermined time period in the low load operating range and in the medium load operating range. On the other hand, in the high load operating range, the engine 14 does not perform the aforementioned intake valve control, and the effective compression ratio and the effective expansion ratio are substantially equal to each other. In other words, the engine 14 is configured such that the ratio of the effective expansion ratio with respect to the effective compression ratio is higher in the low load operating range and in the medium load operating range, as compared with the high load operating range.

Further, when the excess air ratio $\lambda$ of the engine 14 is set to be 1 in the high load operating range including the full load condition in a warm state of the engine 14, the ignition mode is set to a spark ignition mode in which the fuel-air mixture in a combustion chamber is ignited by driving of an ignition plug; and the ignition mode is set to a compression ignition mode in which the fuel-air mixture in the combustion chamber is compressed and ignited in an operating range other than the above (in other words, in the medium load operating range and in the low load operating range) where the excess air ratio $\lambda$ is set to be from 2 to 8 (or the G/F is set to be from 30 to 120).

Figure 2:
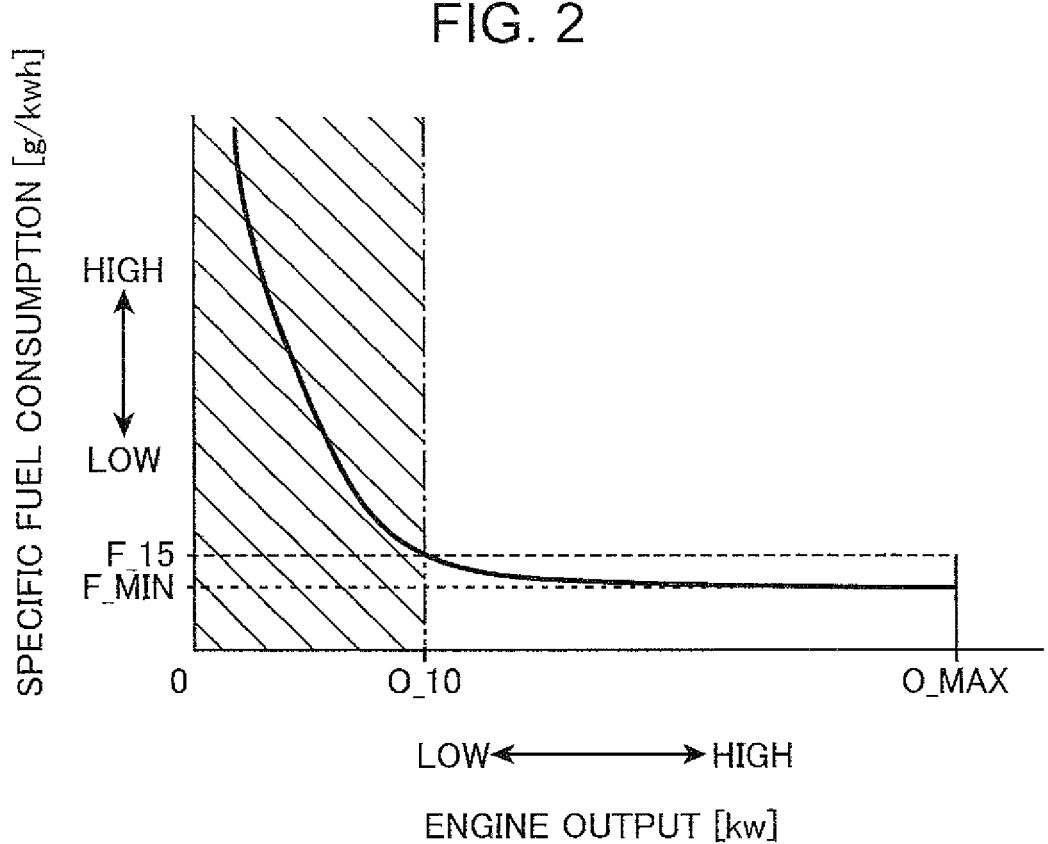
FIG. 2 is a graph illustrating characteristics (specific fuel consumption characteristics) of an engine of the hybrid vehicle illustrated in FIG. 1.

According to the aforementioned configuration, an indicated thermal efficiency of the engine 14 is enhanced, and the fuel economy is remarkably improved. FIG. 2 is a graph illustrating a relationship (specific fuel consumption characteristics) between output (kw) of the engine 14, and specific fuel consumption (g/kwh). As illustrated in FIG. 2, the specific fuel consumption of the engine 14 is improved, as the output increases. The specific fuel consumption reaches minimum specific fuel consumption F_MIN at a specific output. Then, the specific fuel consumption is substantially flat in the operating range where the engine output exceeds the specific output. Thus, the specific fuel consumption is maintained at the minimum specific fuel consumption F_MIN or near the minimum specific fuel consumption F_MIN. For instance, the output of the engine 14 where the specific fuel consumption is higher than the minimum specific fuel consumption F_MIN by the amount corresponding to 15% to 20% (in the example of FIG. 2, 15%) of the minimum specific fuel consumption F_MIN, is 10% of the maximum output of the engine 14. Therefore, in the operating range where the engine output exceeds the output (O_10), the specific fuel consumption is maintained at the minimum specific fuel consumption F_MIN or near the minimum specific fuel consumption F_MIN.

In the case of the hybrid vehicle 1, the output of not larger than 10% of the maximum output is an output required in a low load operating range e.g. at the time when the vehicle is started, and at the time when the vehicle runs at a low speed after the start of the vehicle. Thus, in the hybrid vehicle 1, low specific fuel consumption from the minimum specific fuel consumption F_MIN to the specific fuel consumption higher than the minimum specific fuel consumption F_MIN by the amount of less than 15% of the minimum specific fuel consumption F_MIN is obtained in the operating range including the medium load operating range and the high load operating range.

The motor 18 is coupled to the axel 12, and is connected to the battery 22 via the inverter 20. Electric power from the battery 14 is supplied to the motor 18 after the electric power is converted into AC power by the inverter 20. The motor 18 functions as an electric motor by supply of the electric power. In other words, the vehicle runs by transmitting a driving force of the motor 18 to the left and right wheels 10 via the axel 12. The motor 18 functions as a generator when the vehicle is decelerated. AC power generated by the motor 18 is converted into DC power by the inverter 20 for charging the battery 22. The motor 18 is described later in detail.

The controller 24 controls driving of the engine 14 and driving of the motor 18 so as to obtain an intended running state of the vehicle for the driver, and controls regeneration of the motor 18 so as to secure required electric power on the basis of input signals from various sensors. The controller 24 is a controller constituted of a well-known microcomputer. The controller 24 is provided with a central processing unit (CPU) which executes a program, a memory constituted of e.g. an RAM or an ROM for storing the program and data, and an input/output (I/O) bus for inputting/outputting electrical signals. The controller 24 includes, as functional elements of the invention, a main control unit 24a, an engine control unit 24b which controls the engine 14, and a motor control unit 24c (corresponding to motor control device of the invention) which controls the motor 18. Each of the control units 24a to 24c may be an individual controller, or the control units 24a to 24c may constitute one controller.

Various types of information is input to the controller 24 from the various sensors provided in the vehicle. As far as the invention is concerned, the vehicle 1 is provided with an accelerator opening degree sensor 30 which detects the accelerator opening degree representing the stepping amount of an accelerator pedal, a brake sensor 32 which detects the stepping amount of a brake pedal, and a vehicle speed sensor 34 which detects the running speed of the vehicle. Signals from the sensors 30, 32, and 34 are input to the controller 24.

In particular, the main control unit 24a of the controller 24 calculates a driving condition, in other words, a required output (a driving torque) of the vehicle on the basis of input signals from the accelerator opening degree sensor 30 and from the vehicle speed sensor 34, and determines whether the engine 14 and the motor 18 are to be driven/stopped on the basis of the calculated required output. The main control unit 24a judges whether the calculated required output of the vehicle is not larger than a predetermined lower limit When the calculated required output is not larger than the lower limit, the main control unit 24a causes the engine 14 to stop so that the wheels 10 are driven solely by the motor 18. When the calculated required output exceeds the lower limit, the main control unit 24a controls the engine 14 so that the wheels 10 are driven solely by the engine 14. In this example, the lower limit is set to a value of 10% of the maximum output of the engine 14. Therefore, in the hybrid vehicle 1, the engine 14 is driven only in the operating range where the engine output exceeds the value of 10% of the maximum output of the engine 14 (namely, in the region other than the hatched region illustrated in FIG. 2). On the other hand, the motor 18 is driven only in the operating range where the required output of the vehicle is not larger than the lower limit. Thus, the motor 18 is used solely for regeneration in the operating range where the required output of the vehicle exceeds the lower limit The main control unit 24a outputs a command signal for driving the engine to the engine control unit 24b when the engine is driven, and outputs a command signal for driving the motor to the motor control unit 24c when the motor is driven.

The engine control unit 24b sets a required output to a target output (a target driving torque) when the required output of the vehicle exceeds the lower imit. Further, the engine control unit 24b calculates a throttle opening degree and a fuel injection pulse on the basis of the target driving torque, and outputs a control signal to a throttle and to an injector.

The motor control unit 24c sets the required output to a target output (a target driving torque) when the required output of the vehicle is not larger than the lower limit, and outputs a control signal to the inverter 20 (a power circuit 50 to be described later) on the basis of the target driving torque. Thus, the motor control unit 24c controls driving of the motor 18. Further, when a signal is input from the brake sensor 32, the motor control unit 24c calculates a target regenerative torque on the basis of the signal, and outputs a control signal to the inverter 20 (the power circuit 50 to be described later) on the basis of the target regenerative torque. Thus, the motor control unit 24c controls regeneration of the motor 18.

Figure 3:
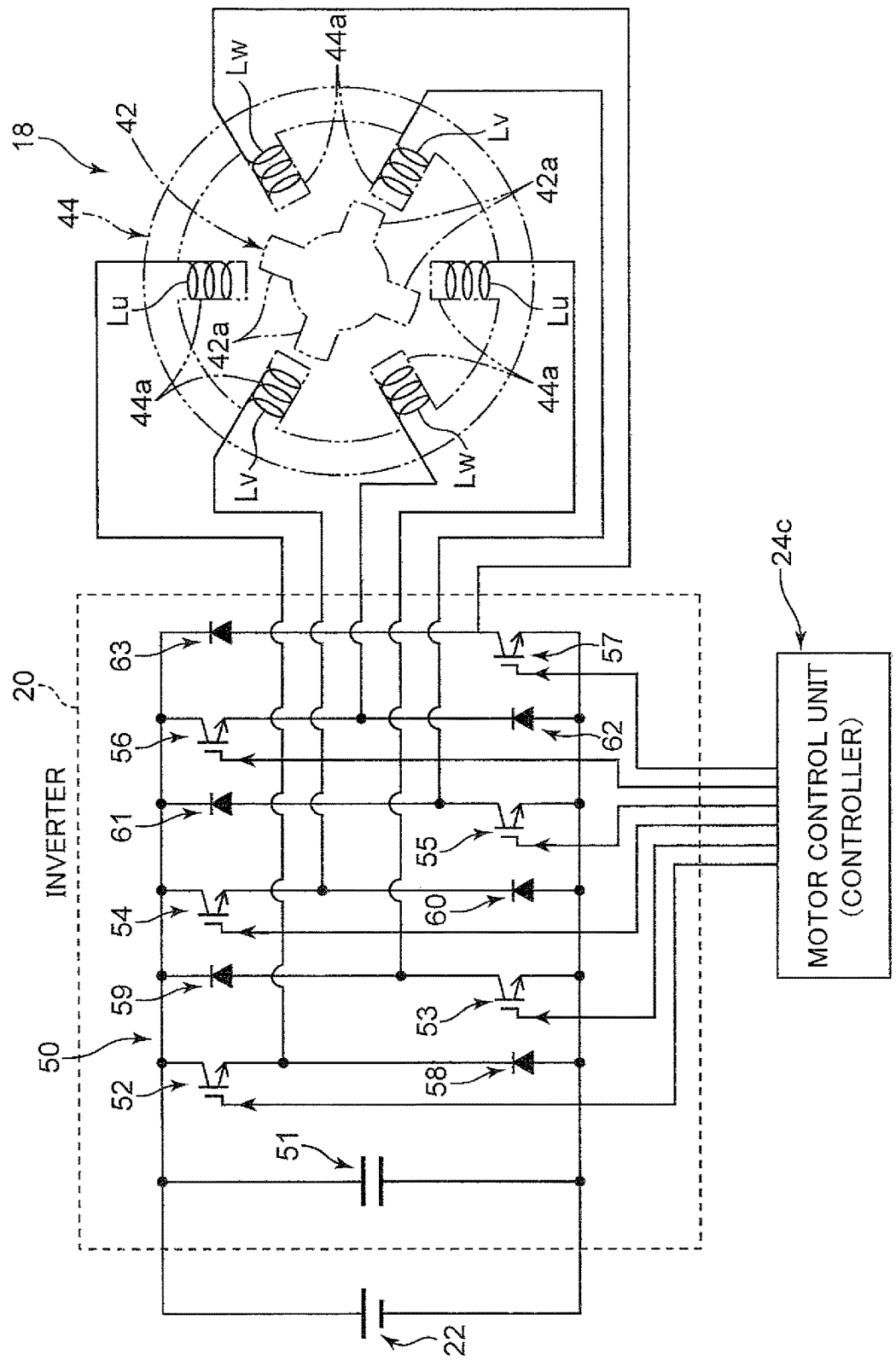
FIG. 3 is a diagram illustrating a configuration of a motor and an inverter (a power circuit) of the hybrid vehicle illustrated in FIG. 1.

FIG. 3 illustrates a configuration of the motor 18, and of the power circuit 50 which supplies electric power to the motor 18.

In this example, the motor 18 is a switched reluctance motor (hereinafter, called as an SR motor). The motor 18 is provided with a rotor 42 including a plurality of radially outwardly projecting rotor electrode portions 42a formed of a magnetic body, and a stator 44 including a plurality of radially inwardly projecting stator electrode portions 44a, which are formed to surround the rotor 42. In this example, the rotor 42 is made of an iron core, and includes four rotor electrode portions 42a. Further, the stator 44 includes six stator electrode portions 44a. Each of the stator electrode portions 44a is a wound wire, and forms 3-phase exciting coils Lu, Lv, and Lw of U-phase, V-phase, and W-phase. In other words, the motor 18 is configured such that each of the exciting coils Lu, Lv, and Lw of the stator 44 is successively energized for magnetically attracting the rotor electrode portions 42a toward the stator electrode portions 44a, whereby a driving torque and a regenerative torque are generated in the rotor 42.

The power circuit 50 supplies, to the motor 18, electric power of the battery 22 by PWM control by the motor control unit 24c. In other words, the power circuit 50 energizes each of the exciting coils Lu, Lv, and Lw. The power circuit 50 is included in the inverter 20.

The power circuit 50 is provided with a capacitor 51; a first circuit unit including an IGBT (insulated gate bipolar transistor) 52 and a diode 58 connected to each other in series; a second circuit unit including an IGBT 53 and a diode 59 connected to each other in series; a third circuit unit including an IGBT 54 and a diode 60 connected to each other in series; a fourth circuit unit including an IGBT 55 and a diode 61 connected to each other in series; a fifth circuit unit including an IGBT 56 and a diode 62 connected to each other in series; and a sixth circuit including an IGB 57 and a diode 63 connected to each other in series. The capacitor 51 and the circuit units constitute a circuit configuration such that each of the capacitor 51 and the circuit units is connected to the battery 22 in parallel. One end of the coil Lu of the motor 18 is connected to the connection point between the IGBT 52 and the diode 58 of the first circuit unit, and the other end of the coil Lu is connected to the connection point between the IGBT 53 and the diode 59 of the second circuit unit. Further, one end of the coil Lv of the motor 18 is connected to the connection point between the IGBT 54 and the diode 60 of the third circuit unit, and the other end of the coil Lv is connected to the connection point between the IGBT 55 and the diode 61 of the fourth circuit unit. Further, one end of the coil Lw of the motor 18 is connected to the connection point between the IGBT 56 and the diode 62 of the fifth circuit unit, and the other end of the coil Lw is connected to the connection point between the IGBT 57 and the diode 63 of the sixth circuit unit.

In other words, when the motor 18 is controlled to be driven/regenerated, the motor control unit 24c outputs a control signal (a PWM signal) having a duty ratio in accordance with a target driving torque/a target regenerative torque to the IGBT 52, 54, 56 of the power circuit 50, whereby the IGBT 52, 54, 56 is turned on and off. Further, the motor control unit 24c outputs a control signal for switching on and off of the IGBT 53, 55, 57 to the IGBT 53, 55, 57 on the basis of a rotation angle of the rotor 42, which is output from an unillustrated rotation angle sensor of the motor 18.

Figure 4:
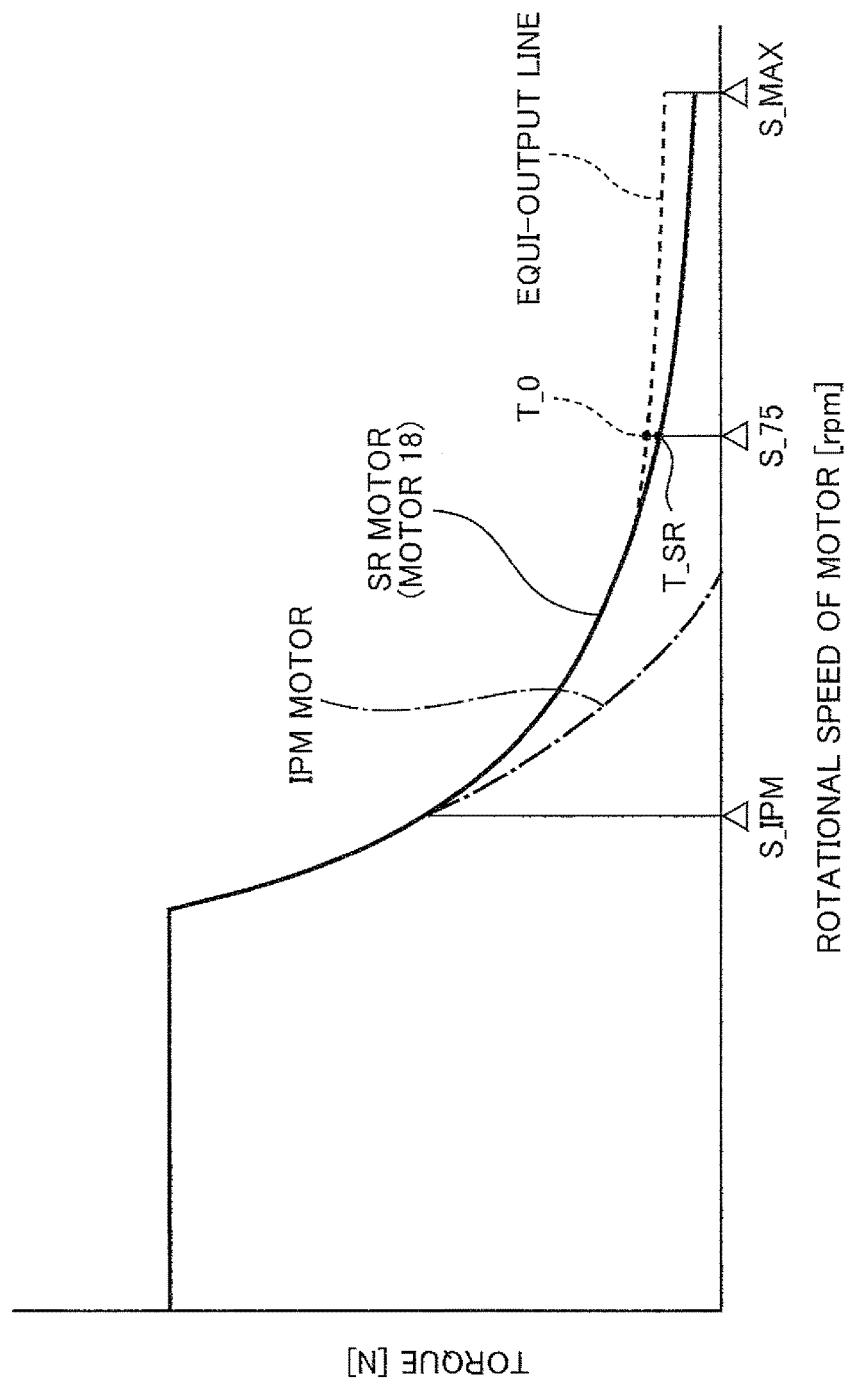
FIG. 4 is a graph illustrating characteristics of the motor of the hybrid vehicle illustrated in FIG. 1.

In the motor (an SR motor), a permanent magnet is not used for the rotor 42 and for the stator 44. Therefore, a counter electromotive force is not generated unlike an IPM motor. Thus, the motor 18 maintains a high motor efficiency up to a high rotational speed range, as compared with the IPM motor. FIG. 4 illustrates a relationship between the rotational speed and the torque (a driving torque/a regenerative torque) of the motor 18 (an SR motor) when the motor load is 10% or more of the maximum load of the motor, and a relationship between the rotational speed and the torque of the IPM motor. In FIG. 4, the solid line represents characteristics of the motor 18 (an SR motor), the chain line represents characteristics of the IPM motor, and the broken line represents an equi-output line.

As illustrated in FIG. 4, when the rotational speed reaches S_IPM, the torque of the IMP motor is sharply lowered, and the output torque deviates from the equi-output line. On the other hand, the torque of the motor 18 (an SR motor) follows the equi-output line, even after the rotational speed exceeds the rotational speed S_IPM, and lowering of the torque is moderate even when the torque characteristics lie in a range out of the equi-output line. Thus, the motor 18 can obtain a large torque up to a high rotational speed range. Specifically, in the motor 18 of this example, the motor efficiency, specifically, the ratio of the generated torque T_SR of the motor 18 with respect to the theoretically maximum output torque T_O is 90% or more at the rotational speed S_75, which is a rotational speed of 75% of the maximum rotational speed S_MAX of the motor, which is the maximum rotational speed at which the motor can be structurally compensated against a temperature rise or a like factor when the motor load is 10% or more of the maximum load of the motor.

Figure 5:
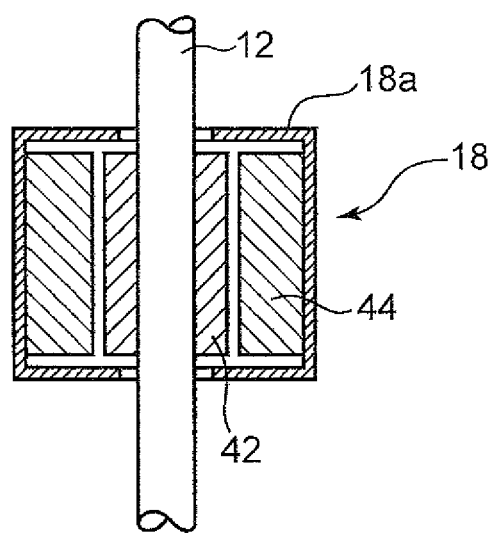
FIG. 5 is a schematic sectional view of the motor.

As illustrated in FIG. 1, the hybrid vehicle 1 is configured such that the motor 18 is directly coupled to the axel 12 without being coupled to the transmission 16. More specifically, as illustrated in FIG. 5, the motor 18 is a motor having a so-called hollow tubular structure (a hollow motor). For instance, the stator 44 is fixed to the inner circumferential surface of a tubular housing 18a, and the rotor 42 is disposed inside the stator 44. The motor 18 is mounted with respect to the axel 12 in such a manner that the axel 12 passes through the rotor 42 and through the stator 44, and then the rotor 42 is fixed to the axel 12. According to this configuration, the motor 18 is coaxially mounted on the axel 12, and the motor 18 is directly coupled to the axel 12.

According to the hybrid vehicle 1 having the aforementioned configuration, as described above, the motor 18 is directly coupled to the axel 12 at a position between the differential gear 17 and the wheel 10, without being coupled to the transmission 16. Therefore, it is possible to efficiently drive the wheels 10, and to collect regenerative electric power by the motor 18. Specifically, when the motor 18 is driven, it is possible to directly transmit the driving force of the motor 18 to the axel 12 without losing the driving force by the transmission 16 or a like element. On the other hand, when the motor 18 is regenerated, it is possible to input kinetic energy exerted during a braking operation from the axel 12 to the motor 18 without losing the kinetic energy by the transmission 16 or a like element. Further, in the hybrid vehicle 1, the motor 18 is an SR motor having characteristics such that the motor efficiency is 90% or more at a rotational speed of 75% of the maximum rotational speed when the motor load is 10% or more of the maximum load of the motor. This makes it possible to efficiently collect kinetic energy of the high-speed rotating axel 12 as regenerative electric power during the high speed run. Thus, unlike a conventional hybrid vehicle in which an IPM motor is coupled to an axel via a transmission, the hybrid vehicle 1 is capable of efficiently using kinetic energy generated in the motor 18 for driving of the hybrid vehicle 1, and is capable of efficiently collecting kinetic energy exerted during a braking operation as regenerative electric power.

Further, the hybrid vehicle 1 is provided with the engine 14 having specific fuel consumption characteristics such that the engine output at specific fuel consumption higher than the minimum specific fuel consumption by the amount corresponding to 15% of the minimum specific fuel consumption is only in the operating range where the engine output is not larger than 10% of the maximum output of the engine. The hybrid vehicle 1 is configured such that the engine 14 is stopped, and the vehicle runs solely by the motor 18 in the operating range where the required output of the vehicle is not larger than 10% of the maximum output of the engine 14 (in the operating range where the specific fuel consumption of the engine 14 is higher than the minimum specific fuel consumption F_MIN by the amount corresponding to 15% or more of the minimum specific fuel consumption F_MIN); and that the vehicle runs solely by the engine 14 in the operating range where the required output exceeds 10% of the maximum output (in the operating range where the specific fuel consumption of the engine 14 does not exceed a value higher than the minimum specific fuel consumption F_MIN by the amount corresponding to 15% of the minimum specific fuel consumption F_MIN). In other words, according to the hybrid vehicle 1, the engine 14 is driven only in the operating range where the specific fuel consumption does not exceed a value higher than the minimum specific fuel consumption F_MIN by the amount corresponding to 15% of the minimum specific fuel consumption F_MIN, and the motor 18 is driven only in the low load operating range e.g. at the time when the vehicle is started and at the time when the vehicle runs at a low speed after the start of the vehicle. Therefore, it is possible to use a relatively low-output compact motor while maintaining low specific fuel consumption in the whole operating range. Thus, the embodiment is advantageous in reducing the weight of the vehicle, and consequently, in improving the specific fuel consumption and in reducing the vehicle cost.

Further, the hybrid vehicle 1 is configured such that the motor 18 is directly coupled to the axel 12 without being coupled to the transmission 16. This makes it possible to reduce the control load by the controller 24 (the motor control unit 24c). Specifically, in the conventional hybrid vehicle in which a motor is coupled to an axel via a transmission, complicated torque control is necessary so that the motor generates an appropriate torque (a driving torque/a regenerative torque), as the transmission is switched. Unlike the conventional hybrid vehicle, the hybrid vehicle 1 is advantageous in reducing the control load by the controller 24 (the motor control unit 24c), because such a complicated torque control is not necessary.

Further, in the hybrid vehicle 1, the motor 18 is directly coupled to the axel 12 without being coupled to the transmission 16. This makes it possible to mount the motor 18 in a relatively small space at a position behind the engine within an engine room. In particular, the hybrid vehicle 1 is configured such that the motor 8 is coaxially mounted with respect to the axel 12 in such a manner that the axel 12 passes through the motor 18. This makes it possible to partially overlap the space for the motor 18 and the space for the axel 12. This is advantageous in efficiently mounting the motor 18 in a narrow space.

As illustrated in FIG. 1, the hybrid vehicle 1 in the embodiment is configured such that the motor 18 is coupled to the axel 12 at a position between the differential gear 17 and the right-side wheel 10. Alternatively, for instance, the motor 18 may be coupled to the axel 12 at a position between the differential gear 17 and the left-side wheel 10.

Figure 6A:
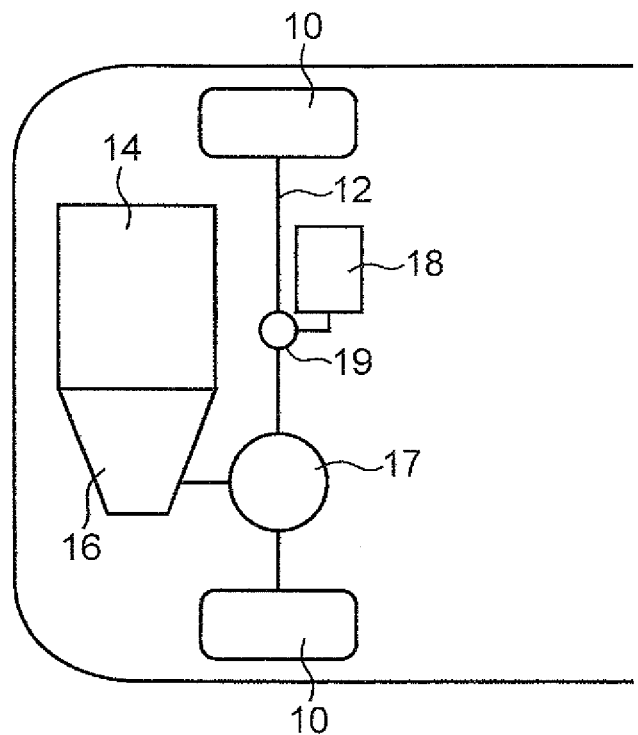
FIGS. 6A and 6B are diagrams illustrating a modification of the layout of the motor.
Figure 6B:
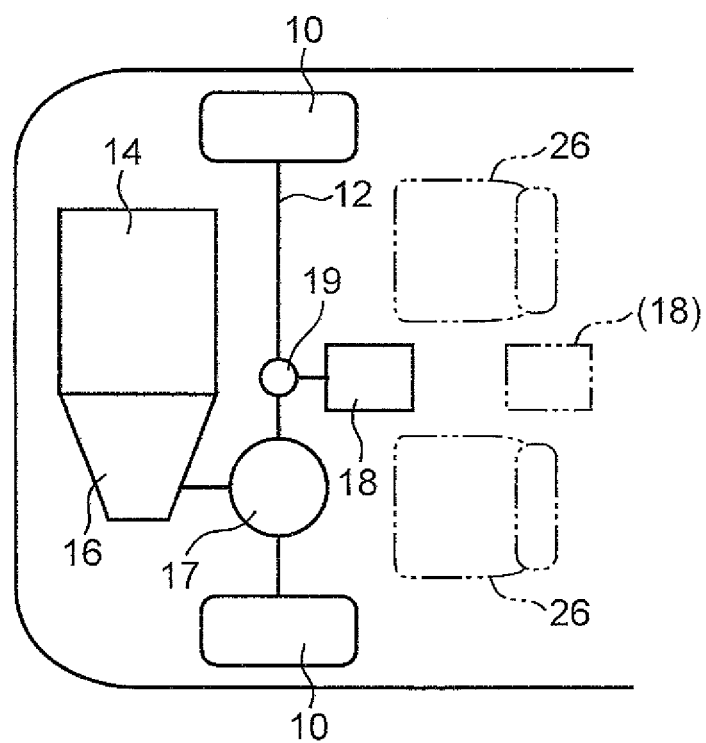

Further, it is possible to use a motor 18 configured such that a rotor rotating shaft projects outwardly. As illustrated in FIG. 6A, it is possible to mount the motor 18 in a state that a rotor rotating shaft and an axel 12 align in parallel to each other in a rear portion of the vehicle with respect to the axle 12, and then, to couple the motor 18 to the axel 12 via a PTO (Power Take Off) unit 19. In this case, as illustrated in FIG. 6B, it is possible to mount the motor 18 in a state that the rotor rotating shaft and the axel 12 are orthogonal to each other. Further, in this case, as illustrated by the two-dotted chain line in FIG. 6B, it is possible to mount the motor 18, while utilizing a relatively small space between the driver's seat and a passenger seat.

The hybrid vehicle 1 embodying the invention has the configuration as described above. The hybrid vehicle 1 is a preferred exemplary embodiment of the inventive hybrid vehicle. The practical configuration of the hybrid vehicle may be modified as necessary as far as such a modification does not depart from the gist of the invention.

The following is a summary of the embodiment of the invention.

An aspect of the invention is directed to a parallel-type hybrid vehicle. The hybrid vehicle includes an engine; a regenerative motor for use when the hybrid vehicle runs, the motor having characteristics such that motor efficiency is 90% or more at a rotational speed of 75% of a maximum rotational speed of the motor when a load of the motor is 10% or more of a maximum load of the motor; and a transmission which transmits power of the engine to a wheel drive shaft. The motor is coupled to the wheel drive shaft without being coupled to the transmission.

The hybrid vehicle is configured such that the motor is coupled to the wheel drive shaft without being coupled to the transmission. This makes it possible to input kinetic energy exerted during a braking operation to the motor, without losing the kinetic energy by the transmission. Further, the motor has characteristics such that the motor efficiency is 90% or more at a rotational speed of 75% of the maximum rotational speed of the motor when the motor load is 10% or more of the maximum load of the motor. This makes it possible to efficiently generate a regenerative torque even in a high rotational speed range, in which it may be difficult for an IPM motor to generate a regenerative torque. Thus, it is possible to effectively collect the kinetic energy of the high-speed rotating wheels as regenerative electric power.

In the aforementioned configuration, preferably, the motor of the hybrid vehicle may be a switched reluctance motor. This is because the switched reluctance motor has the aforementioned characteristics such that the motor efficiency is 90% or more at a rotational speed of 75% of the maximum rotational speed of the motor when the motor load is 10% or more of the maximum load of the motor.

In the hybrid vehicle, preferably, the engine may have specific fuel consumption characteristics such that an engine output at specific fuel consumption higher than minimum specific fuel consumption by an amount corresponding to 15% to 20% of the minimum specific fuel consumption may be only in an operating range where the engine output is not larger than 10% of a maximum output of the engine.

According to the aforementioned configuration, the engine constantly maintains low specific fuel consumption (reduction of specific fuel consumption per engine output) in the operating range where the engine output exceeds 10% of the maximum output of the engine. Therefore, it is possible to cause the vehicle to run by the engine in a wide operating range, and to restrict the operating range in which the motor is required to be driven to an operating range where the required output of the vehicle is extremely low.

In the aforementioned configuration, preferably, the hybrid vehicle may further include control device which controls driving of the engine and driving of the motor. The control device calculates a target output of the engine in accordance with a running state of the hybrid vehicle, and controls to stop the engine and to cause the hybrid vehicle to run by the motor in an operating range where the target output is not larger than 10% of the maximum output of the engine, and controls to cause the hybrid vehicle to run by the engine, while causing the motor to perform solely a regenerating operation in an operating range other than the operating range where the target output is not larger than 10% of the maximum output.

According to the aforementioned configuration, the motor is driven only when the vehicle is started and when the vehicle runs at a low speed immediately after the start of the vehicle. The motor is used solely for regeneration (generation of electricity) in the operating range other than the aforementioned operating range. This makes it possible to use a low-output compact motor as the motor of the vehicle. Thus, the aforementioned configuration is advantageous in reducing the weight of the vehicle, and consequently, in improving the specific fuel consumption and in reducing the vehicle cost.

In the hybrid vehicle, preferably, the motor may have a hollow tubular structure, and the motor may be coaxially mounted with respect to the wheel drive shaft in a state that the wheel drive shaft passes through the motor.

According to the aforementioned configuration, it is possible to coaxially mount the motor on the wheel drive shaft in a compact manner. This is advantageous in designing the layout of the motor.

Further, in the hybrid vehicle, preferably, the motor may be coupled to the wheel drive shaft in a state that a rotor rotating shaft is orthogonal to the wheel drive shaft.

According to the aforementioned configuration, it is possible to mount the motor while utilizing a space between the driver's seat and a passenger seat. This is advantageous in mounting the motor while efficiently using a vacant space of the vehicle.

The invention claimed is:

1. A parallel-type hybrid vehicle, comprising:
an engine;
a regenerative motor for use when the hybrid vehicle runs, the motor having characteristics such that motor efficiency is between 90% and 100% at a rotational speed of 75% of a maximum rotational speed of the motor when a load of the motor is between 10% and 100% of a maximum load of the motor, wherein the motor is a switched reluctance motor, which is provided with a rotor and a stator, and wherein a permanent magnet is not used for the rotor and stator; and
a transmission which transmits power of the engine to a wheel drive shaft, wherein
the motor is directly coupled to the wheel drive shaft without being coupled to the transmission,
a battery configured to be charged with electric power generated by the motor, and
the motor is regenerated with electric power by a kinetic energy of a rotating wheel when a wheel connected to the wheel drive shaft is a high speed rotating wheel.

2. The hybrid vehicle according to claim 1, wherein
the engine has specific fuel consumption characteristics such that an engine output at specific fuel consumption higher than minimum specific fuel consumption by an amount corresponding to 15% to 20% of the minimum specific fuel consumption is only in an operating range where the engine output is not larger than 10% of a maximum output of the engine.

3. The hybrid vehicle according to claim 2, further comprising:
a control device which controls driving of the engine and driving of the motor, wherein
the control device calculates a target output of the engine in accordance with a running state of the hybrid vehicle, and controls to stop the engine and to cause the hybrid vehicle to run by the motor in an operating range where the target output is not larger than 10% of the maximum output, and controls to cause the hybrid vehicle to run by the engine, while causing the motor to perform solely a regenerating operation in an operating range other than the operating range where the target output is not larger than 10% of the maximum output.

4. The hybrid vehicle according to claim 1, wherein
the motor has a hollow tubular structure, and
the motor is coaxially mounted with respect to the wheel drive shaft in a state that the wheel drive shaft passes through the motor.

5. The hybrid vehicle according to claim 1, wherein
the motor is coupled to the wheel drive shaft in a state that a rotor rotating shaft is orthogonal to the wheel drive shaft.

6. A parallel-type hybrid vehicle, comprising:
a gasoline engine designed in such a manner that a geometric compression ratio $\epsilon$ is set to a high compression ratio of not smaller than 13 but not larger than 18, the gasoline engine having specific fuel consumption characteristics such that an engine output at specific fuel consumption higher than minimum specific fuel consumption by 15 to 20% of the minimum specific fuel consumption is only in an operating range where the engine output is not larger than 10% of maximum output of the engine, and the fuel consumption is decreased sharply from 0% to 10% of maximum output of the engine by setting a spark ignition mode, in which an excess air ratio $\lambda$ the engine is 1, and a fuel-air mixture in a combustion chamber is ignited by driving of an ignition plug in a high load operating range; and by setting a compression ignition mode, in which the excess air ratio λ is from 2 to 8, and the fuel-air mixture in the combustion chamber is compressed and ignited in a medium load operating range and in a low load operating range;

a switched reluctance motor for use when the vehicle runs, the motor being a regenerative motor, the motor having characteristics such that motor efficiency is between 90% and 100% at a rotational speed of 75% of a maximum rotational speed of the motor when motor load is between 10% and 100% of a maximum load of the motor;

a battery which supplies electric power for operating the motor as an electric motor, the battery being capable of charging electric power regenerated by the motor; and a transmission which transmits power of the engine to a wheel drive shaft, wherein the motor is coupled to the wheel drive shaft without being coupled to the transmission.

7. The hybrid vehicle according to claim 6, further comprising:

a control device which controls driving of the engine and driving of the motor, wherein the control device calculates a target output of the engine in accordance with a running state of the hybrid vehicle, and controls to stop the engine and to cause the hybrid vehicle to run by the motor in a low load operating range where the target output is not larger than 10% of the maximum output of the engine.

8. The hybrid vehicle according to claim 7, wherein in an operating range other than the operating range where the target output is not larger than 10% of the maximum output, the control device controls to cause the hybrid vehicle to run by the engine, and causes the motor to perform solely a regenerating operation.

9. The hybrid vehicle according to claim 6, wherein the motor has a hollow tubular structure, and is coaxially mounted with respect to the wheel drive shaft in a state that the wheel drive shaft passes through the motor.

10. The hybrid vehicle according to claim 6, wherein the motor is coupled to the wheel drive shaft in a state that a rotor rotating shaft is orthogonal to the wheel drive shaft.

11. A parallel-type hybrid vehicle, comprising:

a gasoline engine designed in such a manner that a geometric compression ratio ε is set to a high compression ratio of not smaller than 13 but not larger than 18, the gasoline engine having specific fuel consumption characteristics such that an engine output at specific fuel consumption higher than minimum specific fuel consumption by 15 to 20% of the minimum specific fuel consumption is only in an operating range where the engine output is not larger than 10% of maximum output of the engine, and the fuel consumption is decreased sharply from 0% to 10% of maximum output of the engine by setting a spark ignition mode, in which an excess air ratio λ of the engine is 1, and a fuel-air mixture in a combustion chamber is ignited by driving of an ignition plug in a high load operating range; and by setting a compression ignition mode, in which the excess air ratio λ is from 2 to 8, and the fuel-air mixture in the combustion chamber is compressed and ignited in a medium load operating range and in a low load operating range;

a switched reluctance motor for use when the vehicle runs, the motor having characteristics such that motor efficiency is between 90% and 100% at a rotational speed of 75% of a maximum rotational speed of the motor when motor load is between 10% and 100% of a maximum load of the motor;

a battery which supplies electric power for operating the motor as an electric motor, the battery being capable of charging electric power regenerated by the motor;

a transmission which transmits power of the engine to a wheel drive shaft; and a control device which controls driving of the engine and driving of the motor, wherein the motor is coupled to the wheel drive shaft without being coupled to the transmission, and the control device calculates a target output of the engine in accordance with a running state of the hybrid vehicle, and controls to stop the engine and to cause the hybrid vehicle to run by the motor in a low load operating range where the target output is not larger than 10% of the maximum output of the engine, and in an operating range other than the operating range where the target output is not larger than 10% of the maximum output, controls to cause the hybrid vehicle to run by the engine, and causes the motor to perform solely a regenerating operation.

12. The hybrid vehicle according to claim 11, wherein the motor has a hollow tubular structure, and is coaxially mounted with respect to the wheel drive shaft in a state that the wheel drive shaft passes through the motor.

13. The hybrid vehicle according to claim 11, wherein the motor is coupled to the wheel drive shaft in a state that a rotor rotating shaft is orthogonal to the wheel drive shaft.

14. The hybrid vehicle according to claim 11, wherein the motor is a switched reluctance motor, which is provided with a rotor and a stator, and a permanent magnet is not used for the rotor and the stator, wherein the motor is directly coupled to the wheel drive shaft without being coupled to the transmission, the battery is configured to be charged with electric power generated by the motor, and the control device controls the motor to be regenerated with electric power by a kinetic energy of a rotating wheel when a wheel connected to the wheel drive shaft is a high speed rotating wheel.

* * * * *